(No Model.)
J. DUNSTEDTER.
WHEEL.
No. 417,995. Patented Dec. 24, 1889.
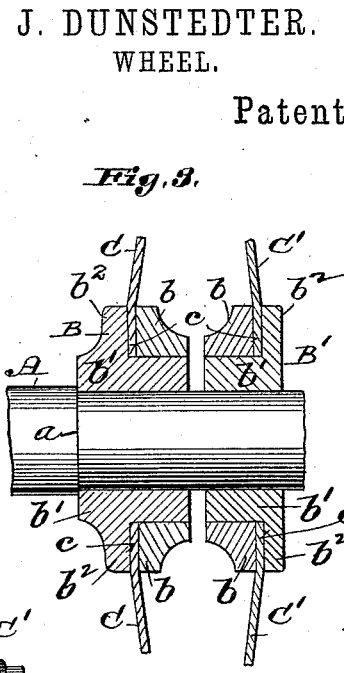
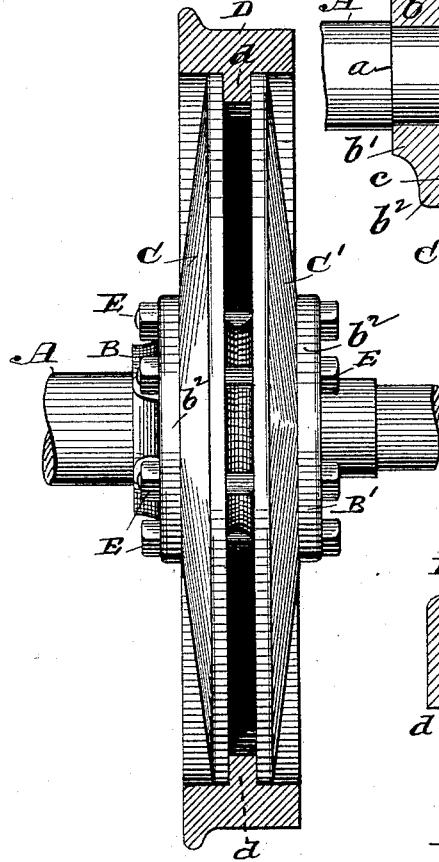
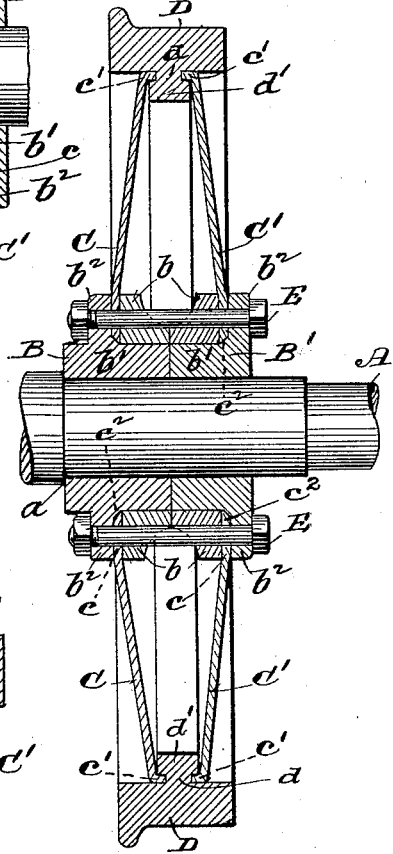
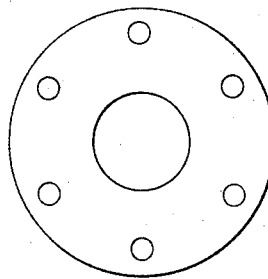
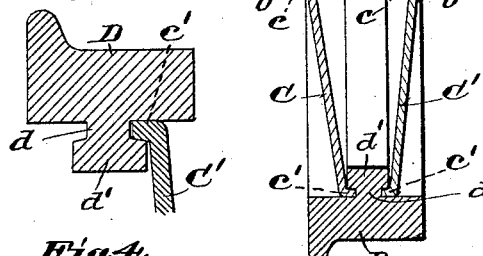
Attest:
Charles Pickles.
G. R. Hinchman Jr.
Inventor:
Jacob Dunstedter
by C. D. Moody
his atty
N. PETERS. Photo-Lithographer, Washington, D. C.

UNITED STATES PATENT OFFICE.

JACOB DUNSTEDTER, OF EDWARDSVILLE, ILLINOIS, ASSIGNOR TO THE STEEL TRUSS CAR WHEEL COMPANY, OF ILLINOIS.

WHEEL.

SPECIFICATION forming part of Letters Patent No. 417,995, dated December 24, 1889.

Application filed May 20, 1889. Serial No. 311,457. (No model.)

*To all whom it may concern:*

Be it known that I, JACOB DUNSTEDTER, of Edwardsville, Illinois, have made a new and useful Improvement in Wheels, of which the following is a full, clear, and exact description.

The improvement is applicable to various forms of wheels, and also to pulleys; and it is especially adapted to car-wheels, in connection with which it is now illustrated.

The improvement relates to that class of wheels in which the sides of the wheel are thrust radially against the rim; and it consists, partly, in the manner of constructing the hub portion of the wheel and partly in the manner of uniting the sides with the rim, and substantially as is hereinafter set forth and claimed, aided by the annexed drawings, making part of this specification, in which—

Figure 1 is a view showing the wheel-rim in section and the interior portion of the wheel in edge elevation. Fig. 2 is a cross-section of the improved wheel finished; Fig. 3, a section of the hub portion of the wheel, the hub parts not being closed together upon the wheel-axle; Fig. 4, a side elevation of the hub, and Fig. 5 a detail showing in section the most desirable mode of uniting the sides and rim.

The same letters of reference denote the same parts.

A, Figs. 1, 2, and 3, represents a portion of a car-axle or other bearing, to which the improved wheel may be applied.

B B' represent the hub—that is, the hub is made in two parts B and B' substantially, and the parts are substantially similar.

C C' respectively represent the sides of the wheel. They are substantially dished plates of springy material—such as steel—and they extend from the hub parts, respectively, to the rim D of the wheel.

The wheel is set up and attached to the axle substantially as follows: The hub parts are virtually collars. They may be each composite structures, or be in the form of a single piece, such as a casting. The form shown is a composite one, a ring $b$ being applied to the main portion $b'$ of the hub part and so as to bind the central portion $c$ of the side C against a flange $b^2$ upon the hub portion $b'$, substantially as is represented. If the hub part is in the form of a casting, the side and hub part may be attached by casting the hub part onto the side; but however it may be made and shaped the inner hub part B is fitted to be and is shrunk onto the axle A, and the side C, if it already has not been thereto attached, is applied to the hub part. The rim is then attached to the side C. The outer hub part B', carrying the outer side C', is then forced onto the axle and the side C' at its periphery connected with the rim. The parts are contrived so that by the time the outer hub part B' has been placed upon the axle in a position approximate to the inner hub part B, substantially as shown in Fig. 3, but not yet in contact with the inner hub part, the sides C C' will have commenced at the center thereof to bear inwardly upon the hub parts, respectively, and at the periphery thereof to bear outwardly against the rim. The inner hub part, by reason of the shoulder $a$ upon the axle, cannot be forced farther onto the axle. The outer hub part can be forced farther onto the axle, and the wheel is completed by forcing the outer hub part farther onto the axle and preferably until it is made to abut against the inner hub part, as shown in Fig. 2. It it this final adjustment of the outer hub part upon the axle which effects the tightening of the wheel parts, for as the hub parts approach each other the sides C C' are sprung more and more toward the rim, and the hub, sides, and rim trussed tighter and tighter together. If desired, bolts E may be used to tie the hub parts together, and thereby strengthen the structure. The sides at the periphery thereof are made to bind against the rim, and also laterally against the sides, respectively, of the inwardly-standing circumferential flange or rib $d$ upon the inner face of the rim; but to better hold the rim upon the sides the rib $d$ at its inner edge is provided with or is extended to form the cross-flange $d'$, and the instanding circumferential peripheral flange $c'$ upon the side comes between the cross-flange and the inner face of the rim. Before the wheel parts are finally tightened into place the flange $c'$, as shown in Fig. 5, does not quite touch the side of the rib $d$ nor the side of the cross-flange $d'$; but when the wheel parts are tightened to a bearing the spaces between the side C and the rim parts $d$ and $d'$ are practically closed. When the rim is thus attached to the sides, it cannot well become detached therefrom, even when a fracture occurs in the rim. The outer face $d^2$ of the cross-flange is preferably beveled to facilitate the fitting of the side flange. The sides C C' at the center may be beveled, substantially as is shown at $c^2$, to insure a better bearing of the side in the hub part. This construction is especially desirable when the hub part is a casting, for when the casting cools it may shrink away from the side edge and by beveling the side edge, as shown, the side can be more readily tightened to a bearing in the hub part than when the inger edge of the side is made square.

I claim—

1. In a wheel, the combination of the rim having an inwardly-projecting circumferential flange, the spring sides engaging against said rib at their outer edges, and the two-part hub, each part being composed of a section hugging the axle and provided with a flange, standing against the outer surface of the adjacent spring side, at the inner edge thereof, and a ring bearing against the inner surface of said spring side and surrounding the inner part of the first section, substantially as specified.

2. The combination of the rim having the inwardly-standing circumferential flange $d$, provided with the double cross-flange $d'$, forming recesses on each side of the flange $d$, the spring sides provided with the instanding circumferential flange $c'$ on its outer edge for insertion into said recesses, and the two-part hub, each part consisting of the ring $b$ and the section $b'$, provided with the outstanding flange $b^2$, substantially as specified.

3. The combination of the rim having the instanding circumferential flange $d$, the spring sides, the two-part hub, each part being composed of the ring $b$ and section $b'$, provided with the flange $b^2$, and the bolts and nuts binding the two parts of the hub closely together, substantially as specified.

Witness my hand this 13th of May, 1889.

JACOB DUNSTEDTER.

Witnesses:
C. D. MOODY,
D. W. C. SANFORD.